United States Patent [19]
Sayant

[11] Patent Number: 5,557,812
[45] Date of Patent: Sep. 24, 1996

[54] WASTE WATER REUSE SYSTEM

[76] Inventor: Eric H. Sayant, P.O. Box 344, Sharbot Lake, Ontario, Canada, K0H 2P0

[21] Appl. No.: 287,364
[22] Filed: Aug. 8, 1994
[51] Int. Cl.$^6$ ..................................................... A47K 4/00
[52] U.S. Cl. ............................................................. 4/665
[58] Field of Search ................................................ 4/665

[56] References Cited

U.S. PATENT DOCUMENTS 4,197,597  4/1980  Toms ........................................ 4/665 X

FOREIGN PATENT DOCUMENTS

| 0427213 | 5/1991 | European Pat. Off. | 4/665 |
| 0160041 | 12/1979 | Japan | 4/665 |
| 4258421 | 9/1992 | Japan | 4/665 |

Primary Examiner—Charles E. Phillips
Attorney, Agent, or Firm—Pascal & Associates

[57] ABSTRACT

A waste water reuse system comprised of a first holding tank for disposition above the toilet tank of a conventional toilet, the holding tank having a waste water inlet located adjacent a top thereof, an overflow outlet located below the waste water inlet, a removable filter disposed within the holding tank between the inlet and outlet in a position to filter water incoming from the inlet, a gravity fed outlet at the bottom of the tank for connection to a water inlet of the conventional toilet, a water supply inlet at or adjacent the bottom of the tank for connection to a fresh water supply, and a float valve connected to the water supply inlet for controlling inflow of fresh water to the holding tank, the float valve having a float ball for causing shut-off of the supply of fresh water at a level substantially below the overflow outlet, and apparatus connecting the waste water inlet to a bathtub water outlet.

5 Claims, 3 Drawing Sheets 5,557,812

WASTE WATER REUSE SYSTEM

FIELD OF THE INVENTION

This invention relates to the field of water conservation, and in particular to a system for reusing waste bath and shower water.

BACKGROUND TO THE INVENTION

The growing shortage of a fresh water supply in many areas, as well as a world-wide concern with the environment, makes it imperative that fresh water resources be used as wisely as possible. However the common flush toilet in use in western countries today uses approximately 2½ gallons of fresh water per flush. A household of four people under normal conditions can be expected to flush between 50 and 60 gallons of clean, fresh water down the toilet each day. A normal bath or shower will use an average about 15 gallons of clean fresh water per use, more or less, depending on the individual. Multiply this use by the number of persons in a multistory building, and it is clear that a very large volume of clean, fresh water is used in each such building. In an urban environment all of this clean fresh water must be purified or otherwise treated, which is costly.

Several patents have issued describing inventions relating to recycling of waste water for the purpose of flushing toilet waste.

For example, U.S. Pat. No. 4,115,879 to Tom, U.S. Pat. No. 3,318,449 to Jennings, and U.S. patent to Kimball describe systems in which waste water is recovered from a variety of sources, such as bathtubs, showers, sinks, washing machines, etc. and store waste water in large holding tanks. However in each of these cases, pumps are required. In addition, strong detergents are present in the waste water due to their sources. These can clog and corrode the pumps.

These systems also require large holding tanks and extensive new plumbing lines. These systems would be extremely expensive and very difficult to retrofit into existing buildings. They also require a considerable amount of space and are not suitable for use in apartment buildings, hotels and similar buildings.

SUMMARY OF THE INVENTION

The majority of multi-story buildings are designed with lavatory facilities on each story one directly above the other. In the present invention, the waste water from the bathtub or shower of a lavatory on one story is used as toilet flush water for the lavatory below. To use the waste water, in a preferred embodiment a waste water holding tank is hung on the wall of each lavatory (except the lavatory on the top story) above the toilet tank of the toilet, and the water outlet of the bathtub or shower of the lavatory above is fed into a waste water inlet of the holding tank. An overflow outlet below the inlet removes excessive water to either the sewer or the waste water inlet of the holding tank in the lavatory of the story below.

Each holding tank has a conventional fresh water inlet and ball valve, to provide a supply of fresh water to flush the toilet in case there is either no waste water or a diminished supply of waste water from the lavatory above. The holding tank also has an outlet which is connected to the conventional fresh water inlet of the toilet. The head of water of at least that provided by the fresh water supply supplies sufficient water pressure to fill the conventional toilet tank.

The holding tank also has a filter, and preferably a screen for retaining a defoaming agent, to catch hair and other undesirable products from being mixed with the water in the holding tank.

The present invention thus requires only the space directly above the existing toilet tank. It is also gravity fed so no pump is required.

The system reuses only the cleanest of waste water from baths and/or showers, containing only mild soaps, making defoaming and disinfecting relatively easy.

The present invention can be easily retrofitted into an existing building, requiring only the placement of the new holding tank above the existing toilet tank, with a minimal amount of plumbing needed to divert bathtub and shower water from the lavatory on the story above to the new holding tank, and the installation of a drain from the holding tank to a conventional drain of the lavatory.

In accordance with an embodiment of the invention, a waste water reuse system is comprised of a first holding tank for disposition above the toilet tank of a conventional toilet. The holding tank has a waste water inlet located adjacent a top thereof, an overflow outlet located below the waste water inlet, a removable filter disposed within the holding tank between the inlet and outlet in a position to filter water incoming from the inlet, and a gravity fed outlet at the bottom of the tank for connection to a water inlet of the conventional toilet A water supply inlet is located at or adjacent the bottom of the tank for connection to a fresh water supply, and a float valve is connected to the water supply inlet for controlling inflow of fresh water to the holding tank, the float valve having a float ball for causing shut-off of the supply of fresh water at a level substantially below the overflow outlet The waste water inlet is connected to a bathtub water outlet of a lavatory above.

A waste water reuse system in accordance with another embodiment is for use in a multistory building having plural lavatories each located on a story one above the other, each being comprised of a conventional toilet and a bathtub. The lavatory of each story except a top story has a first holding tank for disposition above the toilet tank of a conventional toilet, the holding tank having a waste water inlet located adjacent a top thereof, an overflow outlet located below the waste water inlet, a removable filter disposed within the holding tank between the inlet and outlet in a position to filter water incoming from the inlet, a gravity fed outlet at the bottom of the tank for connection to a water inlet of the conventional toilet, a water supply inlet at or adjacent the bottom of the tank for connection to a fresh water supply, and a float valve connected to the water supply inlet for controlling inflow of fresh water to the holding tank. The float valve has a float ball for causing shut-off of the supply of fresh water at a level substantially below the overflow outlet. Each waste water inlet is connected to a water outlet of a bathtub located on a story above.

BRIEF INTRODUCTION TO THE DRAWINGS

A better understanding of the invention will be obtained by reading the description of the invention below, with reference to the following drawings, in which:

FIG. 1 is a view of an embodiment of the invention, the holding tank being illustrated in section, FIG. 2 is a view of lavatories of a high rise building, and FIG. 3 is a side view of the holding tank of the invention.

DETAILED DESCRIPTION OF THE INVENTION

Figure 1:
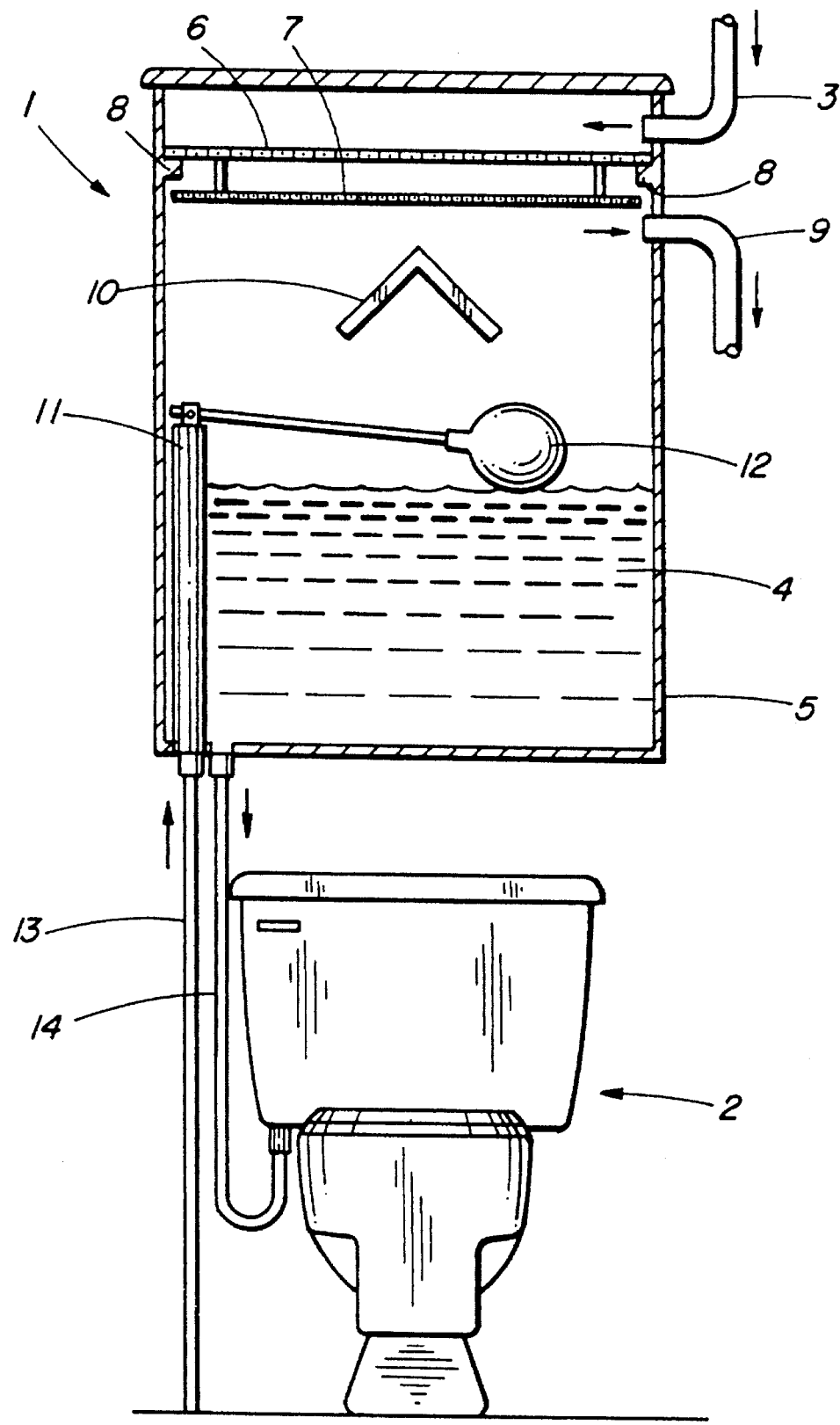

Turning to FIG. 1, a waste water holding tank 1, which can usefully be about 24" by 10" by 48", which is of a size to hold approximately 40 U.S. gallons, is fastened on the wall of a lavatory, with its bottom approximately 10" above the water storage tank of a conventional toilet 2. The space between the tank 1 and the toilet tank, in addition to allowing the cover to be removed from the toilet tank for maintenance, provides a head for water pressure for filling the toilet tank. The tank can be formed of durable molded plastic or fiber glass.

A waste water inlet pipe 3 is connected to the holding tank 1 adjacent its top, preferably by means of a threaded plug. An overflow pipe 9 is connected to the holding tank 1 at a position below the inlet pipe 3.

Figure 2:
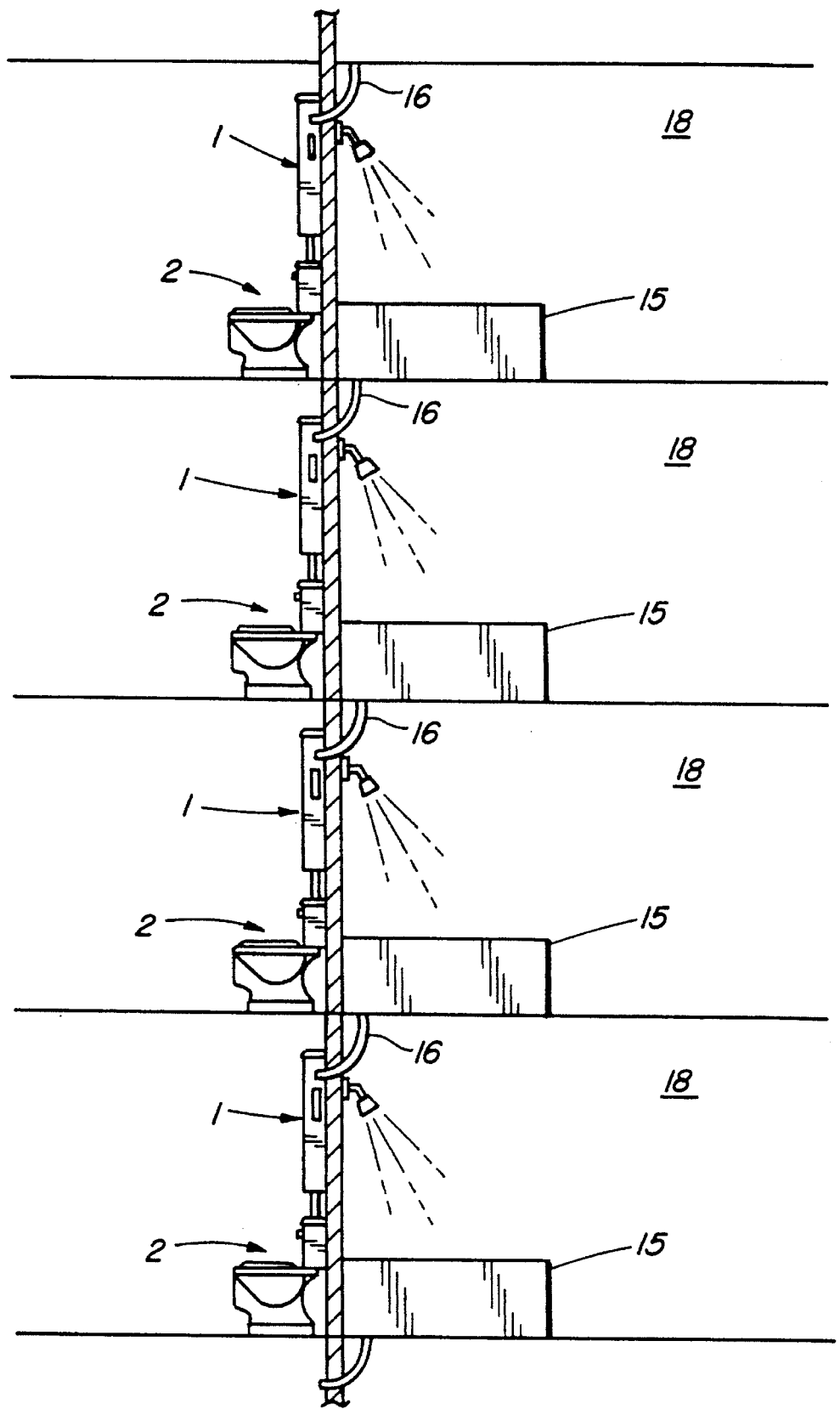

As shown in FIG. 2, the inlet pipe 3 of each holding tank 1 of each story is connected to the drain (outlet pipe) 16 of the bathtub 15 or shower of the lavatory located on a story above. Thus as each bathtub or shower is used, the waste drain water is led via pipe 3 to the holding tank 1. The holding tank 1 thus fills with water 4, and excess water flows out the overflow pipe 9. This excess water can be led to the main building drain, or to a Y connection to inlet pipe 3 or separate inlet of the holding tank 1 of the lavatory below.

In order to filter hair, etc. from the waste water, a removable filter such as screen 6 is held in position across the holding tank 1 by means of brackets 8. Another screen 7 is suspended in a similar manner, or is suspended from filter 6, which screen 7 retains disinfectant and a defoaming agent, to remove unpleasant appearance or odors from the water.

A conventional fresh water intake 11 is also connected to the bottom of holding tank 1, with a conventional ball float valve 12. A water fillpipe 14 is connected from the bottom of the holding tank 1 to the conventional water intake of the toilet 2.

In operation, should there be no or little waste water supplied from the lavatory above, fresh water enters the intake assembly 11, and fills the holding tank to the level allowed by the valve ball 12. This level should be sufficient to at least fill the tank of the toilet 2. Flushing the toilet 2 will allow intake of water from the tank 1 to refill the tank of toilet 2. The tank 1 will refill to the required level through fresh water supply line 13.

However, if waste water is available from a the bathtub or shower of the lavatory on a story above, assuming that there is water in the tank 1 sufficient to close the fresh water intake by means of the float valve, the waste water flows through pipe 3, is filtered, defoamed and disinfected via filters 6 and 7, and fills the tank 1. It covers the float 12, and can fill the tank to the level of overflow pipe 9.

When the toilet is flushed, it refills from the holding tank 1, and the water level in the tank 1 drops with successive flushes until it is below the level of the float, whereupon the tank 1 fills with fresh water until the float valve shuts off the fresh water intake as described earlier.

It is preferred that the holding tank 1 should have a removable cover to enable removal for cleaning of the filters 6 and 7.

It is also preferred that the holding tank 1 should contain a girt 10, which extends and is fixed to opposite internal walls of the tank 1, and supports the sides of the tank from bowing out due to the head of water contained therein. The girt is preferably in the form of an inverted "V", so as to be used as a water deflector for incoming waste water that has passed through filters 6 and 7.

In the aforenoted manner, waste water from upper stories are used as flush water in toilets of lower stories. It can be retrofitted to existing buildings without significant difficulty, and can be built into a false cupboard, making it pleasing to the eye, the false cupboard also covering plumbing refit structures.

Since the present invention is gravity fed, no pump is required. Only a minimum amount of plumbing is required to divert the bathtub and/or shower water from the lavatory above to the new holding tank below, and to divert overflow water to a drain.

Figure 3:
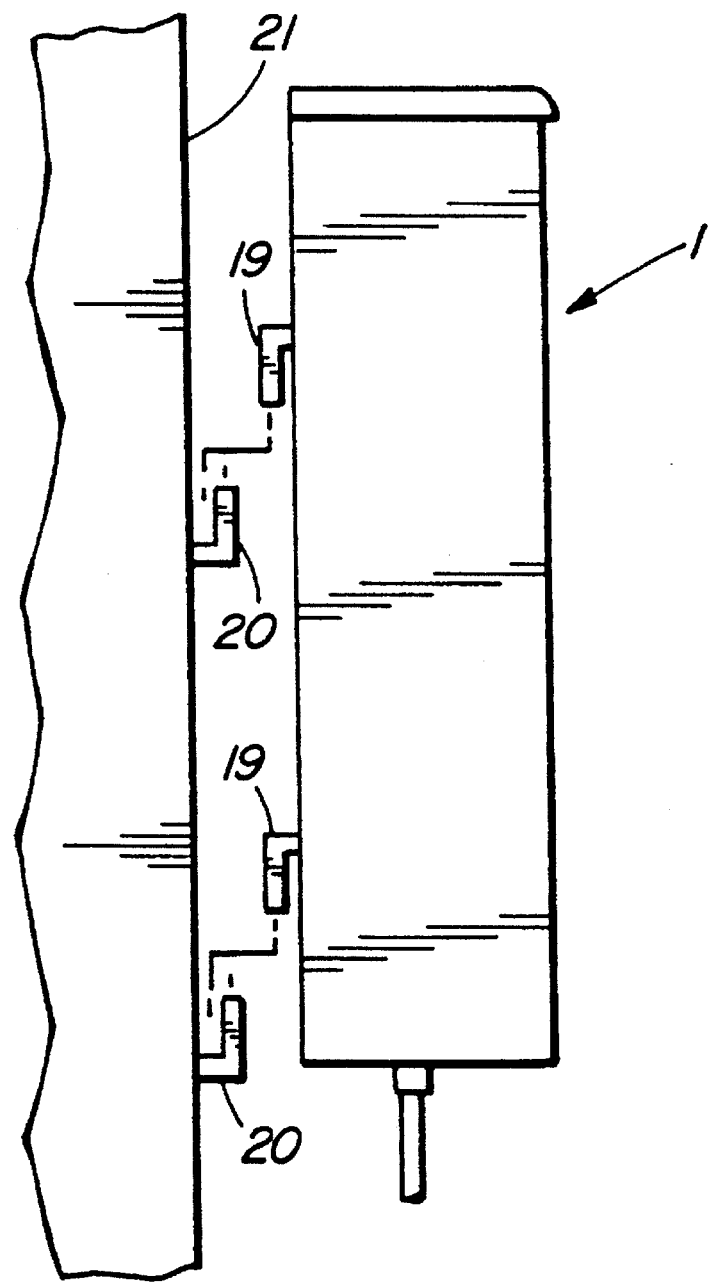

It is preferred as shown in FIG. 3 that the holding tank 1 should have hooks 19 on its exterior rear surface, which mate with supports 20 fixed to the lavatory wall 21 above the toilet. The tank 1 can thus be carried to the position of the supports and lowered, thereby engaging hooks 19 with supports 20, whereby the tank 1 is supported above the toilet.

A person understanding this invention may now conceive of alternative structures and embodiments or variations of the above. All of those which fall within the scope of the claims appended hereto are considered to be part of the present invention.

I claim:

1. A waste water reuse system comprising a first holding tank for disposition above the toilet tank of a conventional toilet, the holding tank having a waste water inlet located adjacent a top thereof, an overflow outlet located below the waste water inlet, a removable filter disposed within the holding tank between the inlet and outlet in a position to filter water incoming from the inlet, a gravity fed outlet at the bottom of the tank for connection to a water inlet of the conventional toilet, a water supply inlet at or adjacent the bottom of the tank for connection to a fresh water supply, and a float valve connected to the water supply inlet for controlling inflow of fresh water to the holding tank, the float valve having a float ball for causing shut-off of the supply of fresh water at a level substantially below the overflow outlet, and means connecting the waste water inlet to a bathtub water outlet, the holding tank further including a water deflector disposed below the filter, the deflector being attached to opposite walls of the holding tank for simultaneously deflecting water incoming from the waste water inlet and structurally supporting said opposite walls.

2. A waste water reuse system for use in a multistory building having plural lavatories each located on stories one above the other, each being comprised of a conventional toilet and a bathtub, the lavatories of each story except a top story each having a first holding tank as defined in claim 1 disposed above the toilet tank of a conventional toilet, and means connecting each waste water inlet except a waste water inlet on a top story, to a corresponding water outlet of a bathtub located on a story above.

3. A waste water reuse system as defined in claim 2, in which the overflow outlet of each holding tank is connected to a sewer system.

4. A waste water reuse system as defined in claim 2 in which each overflow outlet is connected to a waste water inlet of a second holding tank which is similar to the first holding tank but is disposed on a story below a story on which the first holding tank is located.

5. A waste water reuse system as defined in claim 2, in which each holding tank has at least one hook on an external rear wall thereof, and further comprising a hook support for said at least one hook fixed to an adjacent lavatory wall, each holding tank being supported on the lavatory wall above the conventional toilet by means of the hook and hook support.

\* \* \* \* \*